US006814215B2

(12) United States Patent
Krampl

(10) Patent No.: US 6,814,215 B2
(45) Date of Patent: Nov. 9, 2004

(54) SUPPORT CONSTRUCTION

(75) Inventor: David Krampl, Wien-Favoriten (AT)

(73) Assignee: Inventio AG, Hergiswil (CH)

( * ) Notice: Subject to any disclaimer, the term of this patent is extended or adjusted under 35 U.S.C. 154(b) by 8 days.

(21) Appl. No.: 10/322,921

(22) Filed: Dec. 18, 2002

(65) Prior Publication Data

US 2003/0116402 A1 Jun. 26, 2003

(30) Foreign Application Priority Data

Dec. 19, 2001 (EP) ............................................ 01811241

(51) Int. Cl.[7] ............................................... B65G 17/00
(52) U.S. Cl. .................................... 198/321; 198/860.1
(58) Field of Search ................................ 198/321, 326, 198/860.1

(56) References Cited

U.S. PATENT DOCUMENTS 4,811,829 A 3/1989 Nakazawa et al.
4,930,623 A * 6/1990 Johnson et al. .......... 198/860.1
5,186,314 A * 2/1993 Clopton ................... 198/860.1
6,374,981 B1 4/2002 Gschwendtner et al.
2002/0175039 A1 * 11/2002 Fargo et al. ................ 198/321

FOREIGN PATENT DOCUMENTS

GB 2 121 748 A 1/1984
GB 2 316 927 A 3/1998
WO WO 98/22382 5/1998

OTHER PUBLICATIONS

K. Klockner, "Alte Fachwerkbauten", XP–002188008.

* cited by examiner

*Primary Examiner*—James R. Bidwell
(74) *Attorney, Agent, or Firm*—Schweitzer Cornman Gross & Bondell, LLP

(57) ABSTRACT

A support construction for an escalator or moving walkway comprises at least one framework element integrally constructed as a flat, non-profiled, cut plate. Multiple framework elements can be assembled into a unitary support construction. By virtue of the simple structure of the support construction. Wherein little welding work is needed, production time for the support construction is substantially reduced over conventional constructions.

12 Claims, 2 Drawing Sheets

SUPPORT CONSTRUCTION

BACKGROUND OF THE INVENTION

There has become known from U.S. Pat. No. 4,811,829 a support construction which consists of framework elements having a plurality of sections. The sections consist of welded-together angle profile members; the sections are welded or screw-connected together at the construction site after having been assembled and disassembled at the factory. Thus, many operations for assembling and cutting to length are necessary. A disadvantage is to be seen in the fact that the mounting effort and mounting time are high, which leads to higher costs. Moreover, utilisation of material is not optimal. Many profile members are barely exploited in terms of stressing. In addition, the profile members are often not optimised in weight.

The present invention thus offers a support construction of the kind having at least one framework element which does not have the aforesaid disadvantages and which provides simple and inexpensive assembly.

BRIEF DESCRIPTION OF THE INVENTION

An advantage is to be seen in the fact that the support construction has few framework elements to be assembled together. By "framework element" it is to be understood a frame structure with at least one enclosed cut-out. Few welding operations are thus needed. The individual framework elements of integral construction are easy to produce and are self-supporting, which means they themselves provide a supporting function.

Advantageously, the framework element is constructed as a flat, non-profiled plate. A significant advantage is the elimination of steel constructional profile members, blanks, cuttings to length, gussets, etc.

In accordance with the foregoing and other objects and purposes, a support construction of the invention comprises at least one framework element of one-piece construction. The elements may be constructed as flat plates, and may have one or more cut-outs. The elements may be constructed as a support wall, transverse frame, or end frame.

Advantageously, the framework element has at least one cut-out which is formed by a cutting process. This has the advantage that the framework elements can be readily optimised with respect to stress and weight. Material utilization can be improved, which leads to significant economic advantages.

Advantageously, the framework element is constructed as a support wall or as transverse frames or end frames. The framework element can thus itself function as a main element of a support construction.

A support construction in accordance with the invention may comprise two support walls which are arranged laterally at a step belt or plate belt of the escalator or moving walkway and which are connected together by the transverse frames or the end frames. Advantageously, in this form of embodiment the actual support construction of the escalator or the moving walkway can consist of these easily producible support elements.

The transverse frames can comprise a transverse connector which has bent-around portions for lateral stiffening. A higher stability of the support construction is thus produced. The support wall may have an upper flange reinforcement against buckling. This similarly increases the stability of the support construction.

The support construction can also comprise an underneath plane which is constructed as a base plate or is provided with diagonals. This element is also easily producible, which can contribute to a further reduction in production costs. Moreover, an underneath plane contributes to three-dimensional stabilization of the support construction.

The support walls, the transverse frames, the end frames, the upper flange reinforcement and the underneath plane may be advantageously fixedly connected together, preferably welded. This insures a firm, stable, finished support construction.

The framework elements can be produced from a flat, areal, non-profiled pre-product, for example sheet-metal plate.

The framework elements can be made in an unmanned, computer-assisted, 24 hour gas-cutting operation. The waste is completely recyclable and reusable. Due to a greater freedom in the shaping of the support wall profile, formal recesses, which then follow a specific optical purpose by virtue of a glass external cladding, can also be incorporated. The support wall can be produced upwardly curved in cambered form (for example, parabolic) so that, under its own weight, no visual bending deflection can be seen.

It is to be appreciated that the embodiments and features as recited are usable not only in their respectively indicated combinations, but also in other combinations or by themselves without departing from the scope of the invention.

BRIEF DESCRIPTION OF THE DRAWINGS

Examples of embodiments of the invention are illustrated in the following description annexed drawings, wherein.

BRIEF DESCRIPTION OF THE INVENTION

Figure 1:
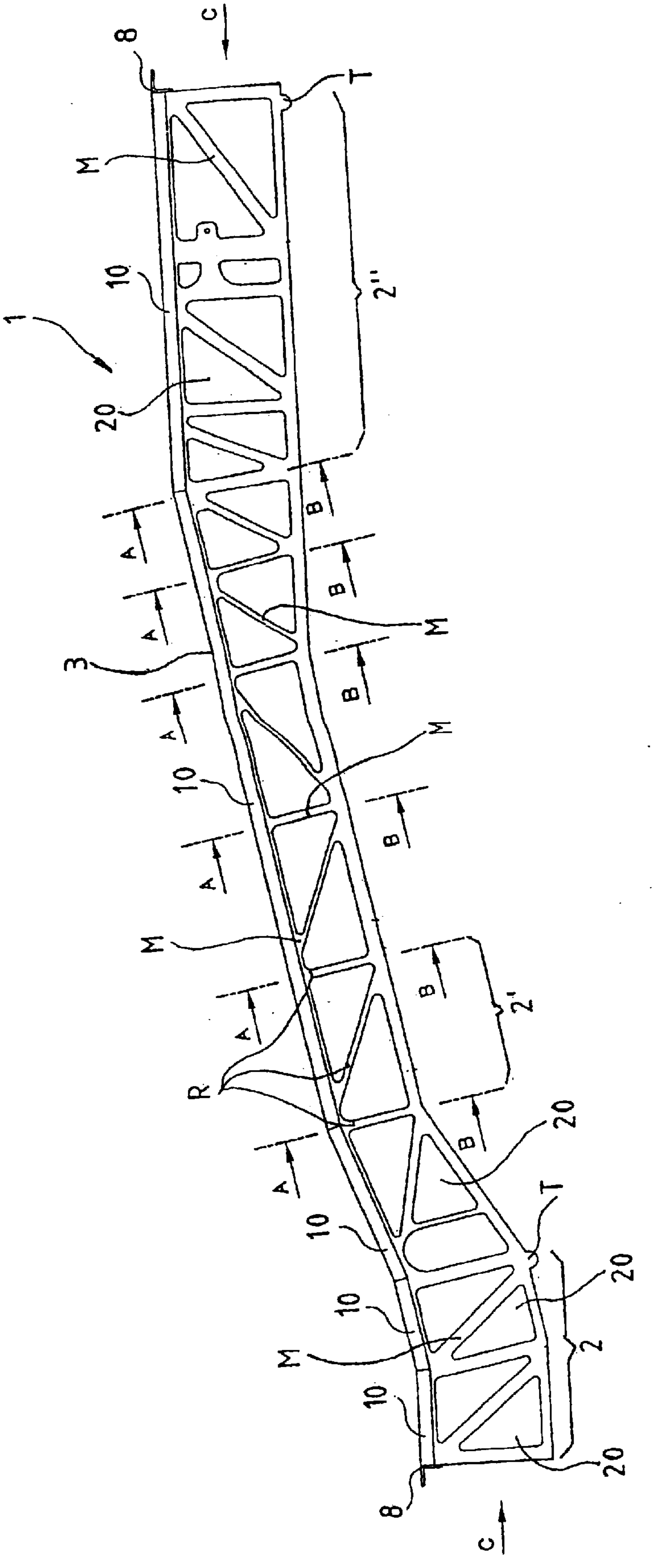
FIG. 1 is a side elevation view of a support construction according to a first embodiment of the invention.

FIG. 1 shows a side view of a support construction 1 in an installed position, for example of an escalator or moving walkway (not illustrated in more detail). A support wall 3 of the support construction 1 is shown and, in this example, comprises several exemplary framework elements 2, 2', 2". Obviously, the support wall 3 can comprise only a single framework element 2, 2' or 2". By "framework element" 2, 2', 2" it is to be understood a frame structure with at least one enclosed cut-out. The support construction 1 for an escalator or a moving walkway usually has two support walls 3, which are arranged at both sides of the step belt of the escalator or the plate belt of the moving walkway. The framework elements 2, 2', 2" of the support wall 3 are of integral construction, i.e. they are made from one piece without various pieces having to be connected together. The framework elements 2, 2', 2" can be made from a flat, planar, unprofiled rolled product, for example sheet-metal plate.

By "flat" it is meant any planar product which has, as a rectangular cross-section, with a width greater than the thickness. Preferably, the width is greater than the thickness by one or several orders of magnitude. As a "planar" product it is to be understood a product which has no elevations or depressions. By a "planar" product it is to be understood a generally two-dimensional product, without significant thickness. The framework elements 2, 2', 2" thus do not comprise, for example, a T profile member, an I profile member, a round profile member, a hollow profile member, an angle profile member or similar profile members, but have absolutely no profiling. The framework element 2 can thus be machined, for example, exclusively from a flat steel sheet or from a plate, which preferably has a thickness of approximately 15 mm. Each framework element 2, 2', 2" has at least one cut-out 20, which is formed by a cutting process. By way of example, the framework element 2' in FIG. 1 has two cut-outs 20 which are separated from one another by the frame structure portions R and are enclosed by the frame structure portions R. By way of further examples. the framework elements 2 and 2" in FIG. 1 exhibit four and eight, respectively, recesses 20. The support wall 3 can consist of one or more, preferably butt-welded framework elements 2, 2', 2", which can be, for example, torch-cut or plasma-cut or laser-cut.

The cut-outs 20 are preferably cut in such a manner that a stress-optimised and weight-optimised support wall is produced. The support wall 3 comprises substantially as much load-bearing material, for example in the form of the webs or beams M, as is needed for exercise of the support function. For this purpose, material is removed in the region of the cut-outs 20 and can be reused for other purposes. The support wall 3 or, more generally, the framework elements 2, 2', 2" is thus an optimised light-weight structure. Stress optimisation of the support wall 3 or, more generally, of the framework elements 2, 2', 2" is achieved in a manner that the support wall 3 or the framework elements 2, 2', 2" have substantially enough load-bearing material in order to accept forces and pass them on to bearers, so that no warping of the entire structure takes place and the stability, stiffness and the like of the entire structure is insured. For this purpose, the cut-outs 20 can have, for example, a triangular outline, while other stress-optimised outlines are equally possible.

An upper flange reinforcement 10 against buckling, which is, for example, constructed in the form of a shaped tube or a rolled angle member, is arranged at the upper side of the support wall 3. Bearer girders 8 are evident at both ends of the ultimate support wall 3, which girders serve as end connections for the support construction 1 and are mounted at the building.

At the lower side of the support wall 3 there are provided transport feet T which can be constructed as contact points and/or anchor points. The transport feet T, which are, for example, integrally formed with a framework element, serve support the framework element on the ground at the construction site so as not to scratch the underneath plane 6.

Figure 2:
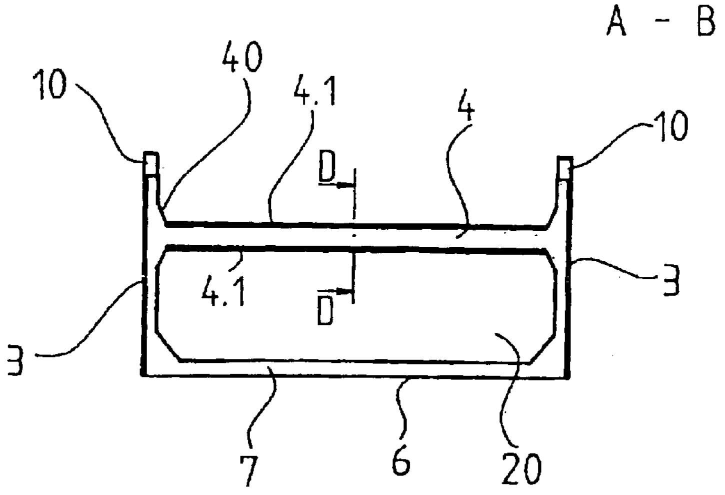
FIG. 2 is a section of the support construction of FIG. 1 along line A—B.

FIG. 2 presents a cross-sectional illustration of the support construction, wherein the two support walls 3 are three-dimensionally connected by a framework element, which is constructed as a transverse frame 40 (also termed a frame member) and an underneath plane 6. The transverse frame 40 comprises a transverse connector 4, which is arranged between the forward run of the step belt or plate belt and the return run thereof and a lower transverse tie 7. The steps of the step belt of the escalator or the plates of the plate belt of the moving walkway run in a first direction above the transverse connector 4 and in a reverse direction below the transverse connector 4. The transverse frame 40 can also consist of one or more framework elements, in which optimised cut-outs 20 have been cut out by means of a torch, plasma or laser cutting process. In this example the transverse frame 40 has only one recess 20 between the transverse connector 4 and the lower transverse tie 7. The transverse frames 40 are distributed at regular or irregular intervals over the entire length of the support construction 1. The transverse frames 40 can similarly be made from a planar steel sheet or plate, which preferably has a thickness of up to approximately 15 mm, and preferably 5 to 10 mm. The underneath plane 6, which can, for example, be constructed as a base plate, further connects the lower ends of the two planar support walls 3. The underneath plane can also be provided with, for example, profiled diagonals (for example, C profile members or U profile members), which serve for frame stiffness in the lower region. The underneath plane 6 can be, for example, steel or stainless-steel sheet. The transverse connector 4 is provided with two bent-around portions 4.1 for improvement in rigidity. The transverse frame 40 further has, in the vicinity of the base and between the planar support walls 3, the lower transverse tie 7, which serves for three-dimensional stabilization. The upper flange reinforcement 10, which is for example constructed to be tubular against buckling, is placed on and welded to the support walls 3 and the transverse frames 40.

Figure 3:
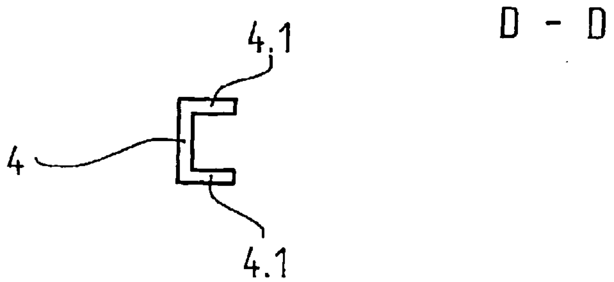
FIG. 3 is a section along line D—D of FIG. 2.

FIG. 3 shows a sectional illustration according to the line D—D of the transverse connector 4, in which the bent-around portions 4.1 are illustrated more clearly. The bent-around portions 4.1 can arise, for example, by bending the transverse connector 4 at one or both of its horizontal ends, for example with the help of a bending machine. In this example the upper and the lower edges of the transverse connector 4 are laterally bent over through approximately 90 degrees, wherein as such the two edges can be bent over less (from 0 to 90 degrees) or more (from 90 to 180 degrees). In general, all possibilities of bending can come into consideration which follow the purpose of improving the lateral rigidity of the transverse frame 4.

Figure 4:
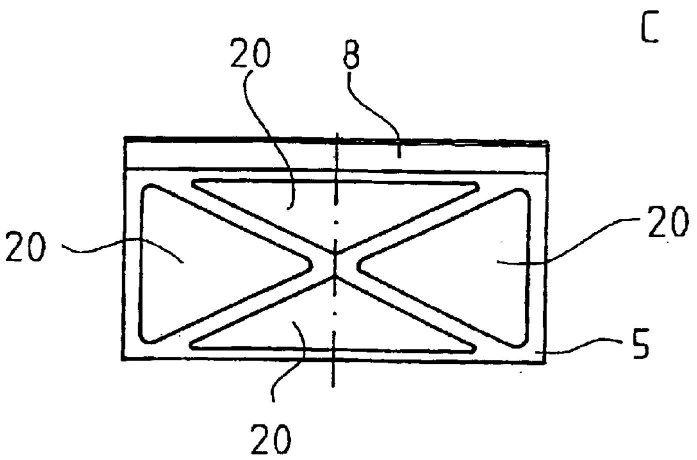
FIG. 4 is a sectional view of an end of the support construction of FIG. 1.

FIG. 4 shows a cross-sectional illustration of the support construction 1 at one of its two ends. As view C, there can be seen the support construction and interconnection between the two sides, as well as a bearer girder 8. A framework element constructed as an end frame 5 connects the support walls 3 at both ends of the support construction. The end frame 5 is similarly machined out of a plate of approximately 15 mm, preferably 8 to 10 mm, thickness, wherein the cut-outs 20 are created by a cutting process, preferably by means of a torch, plasma or laser cutting process. In this form of embodiment the end frame 5 consists of a single framework element and has four cut-outs 20. The end frame 5 can obviously also consist of several framework elements. The bearer girder 8 serves as an end connection in the uppermost region of the support construction.

In summary, the support construction comprises, in a preferred form of embodiment, two torch-cut, plasma-cut or laser-cut support walls 3, a series of similarly torch-cut, plasma-cut or laser-cut transverse frames 40 and end frames 5, the upper flange reinforcement 10 against buckling, the underneath plane 6, the bearer girders 8 and optionally additional stiffenings, such as main shaft receptacles (bearing flanges), etc. The underneath plane 6 is, for example, constructed as a base plate or may comprise a diagonal structure. The support walls 3, transverse frames 40 and end frames 5 are torch-cut, plasma-cut or laser-cut, without appreciable finishing work, from one or more preferably butt-welded plate cut parts constructed as framework elements. This form of support construction is particularly suitable for smaller span widths, for example for department store stairs.

The upper flange reinforcement 10 rests on the support walls 3 over the entire length thereof and is welded thereto. The transverse frames 40 and the end frames 5 serve as spatial stiffening and are additionally welded to the upper flange reinforcement 10. The bearer girders 8 serve as an end connection of the frame construction and are welded only to the upper flange reinforcement 10, but also to the support walls 3.

The support frames 40 and end frames 5 are thus fixedly and permanently connected, preferably welded, in the finished support construction to the upper flange reinforcement 10, the underneath plane 6 and the support walls 3.

By virtue of the simple build-up of the support construction without very much welding work, production time and mounting time are substantially reduced. The work expenditure per support construction is small, since the support walls 3 are prefabricated (cut).

The pre-product, particularly plate, used for production of the framework elements has a thickness of, preferably, approximately 15 mm, wherein other thicknesses, for example from 5 mm to 50 mm, are also usable.

Through the 'cut support construction' in accordance with the invention there is thus obtained a weight-optimised and stress-optimised support construction for escalators and moving walkways.

I claim:

1. A support construction for an escalator or a moving walkway, comprising at least one framework element, characterized in that the framework element is of a one-piece construction having at least one cut-out which is formed by means of a cutting process.

2. A support construction for an escalator or a moving walkway, comprising at least one framework element, characterized in that the framework element is of a one-piece construction constructed as a flat non-profiled plate.

3. The support construction according to claim 2, characterized in that the framework element has at least one cut-out which is formed by means of a cutting process.

4. The support construction according to claim 2 or claim 1, characterized in that the framework element is constructed as a support wall, a transverse frame, or an end frame.

5. The support construction according to claim 4, characterized in that the support construction has two support walls which are arranged laterally at a step belt or plate belt of the escalator or moving walkway and which are connected together by transverse frames or end frames.

6. The support construction according to claim 4, characterized in that the transverse frame comprises a transverse connector which has bent-around portions for lateral stiffening.

7. The support construction according to claim 4, characterized in that the support wall has an upper flange reinforcement against buckling.

8. The support construction according to claim 5, characterized in that the support construction has an underneath plane.

9. The support construction according to claim 8, wherein the underneath plane is constructed as a base plate.

10. The support construction according to claim 8, wherein the underneath plane includes diagonals.

11. The support construction according to claim 8, characterized in that the support walls, the transverse frames, the end frames, and the underneath plane are fixedly connected together.

12. A method of producing a support construction for an escalator or moving walkway, which support construction comprises at least one framework element, characterized in that the framework element is cut from a single piece of stock.

* * * * *